May 30, 1944.  T. P. TAPPER  2,349,805

MOLDING PRESS

Filed May 20, 1941  5 Sheets-Sheet 1

Inventor:-
Thomas P. Tapper
by his Attorney

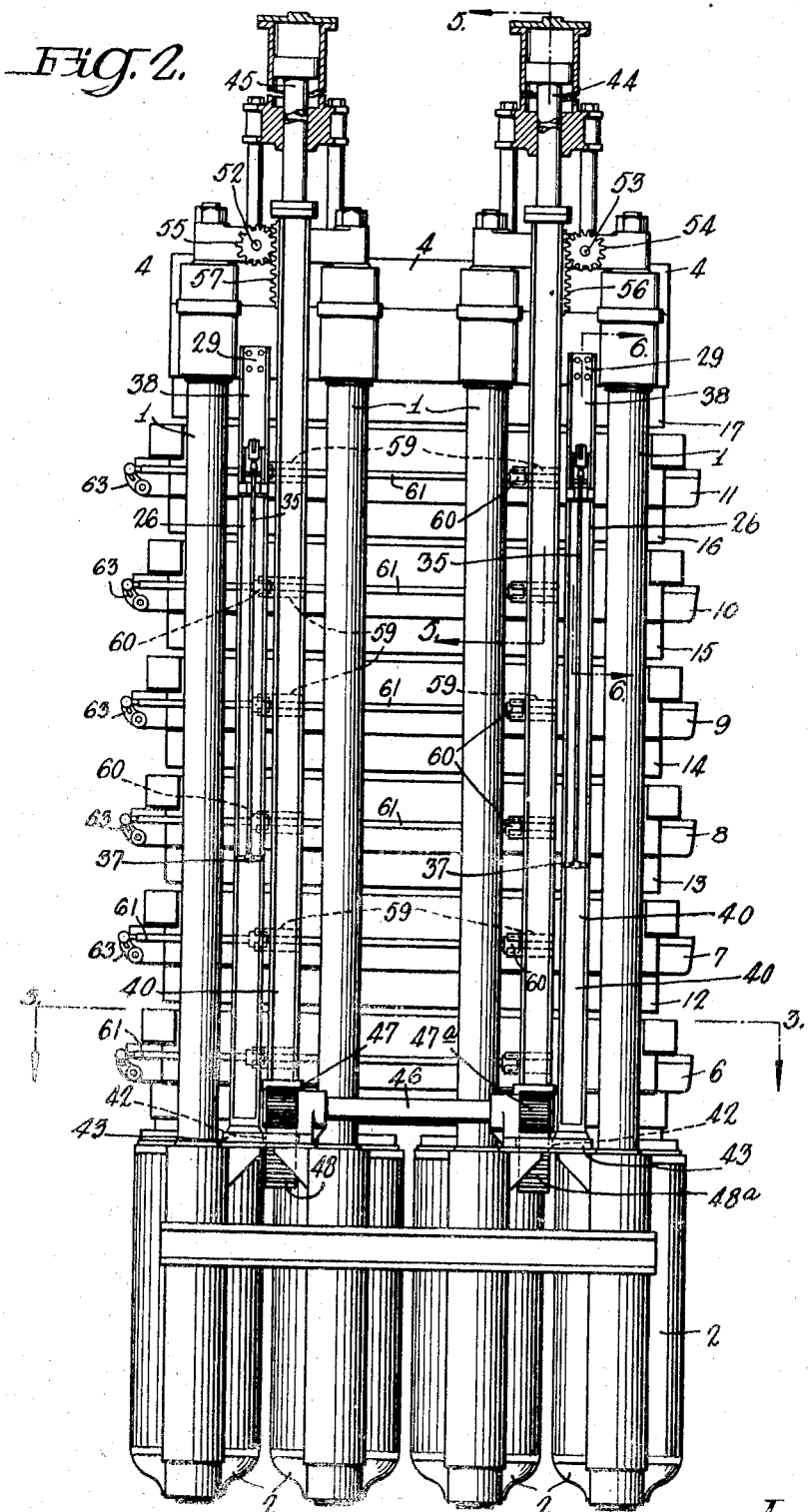

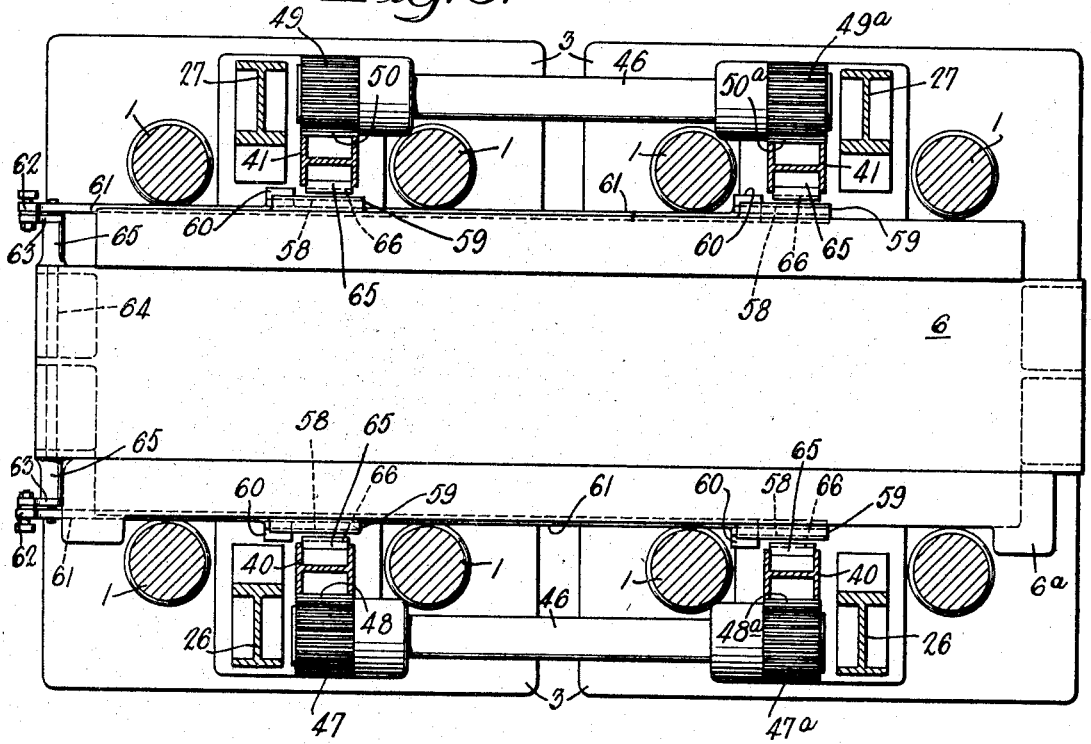

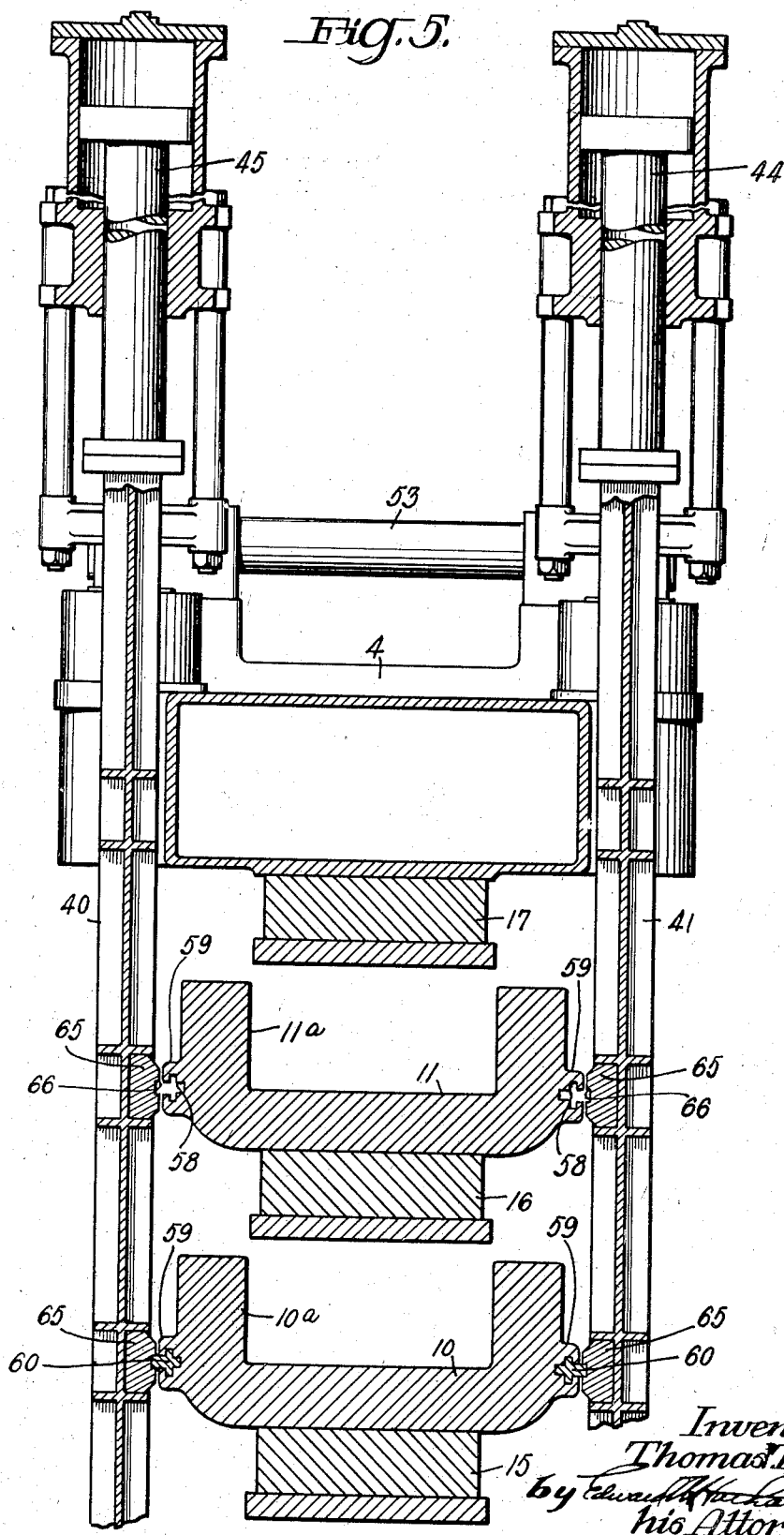

May 30, 1944. T. P. TAPPER 2,349,805
MOLDING PRESS
Filed May 20, 1941 5 Sheets-Sheet 5

Inventor:-
Thomas T. Tapper
by Edward A. Richards
his Attorney

Patented May 30, 1944

2,349,805

UNITED STATES PATENT OFFICE 2,349,805

MOLDING PRESS

Thomas P. Tapper, Prospect Park, Pa., assignor to The Baldwin Locomotive Works, a corporation of Pennsylvania Application May 20, 1941, Serial No. 394,320

14 Claims. (Cl. 18—16)

This invention relates generally to molding presses and more particularly to means for separating the upper and lower parts of a mold for purposes of either cleaning the same or of breaking them apart in the event of their sticking together after a molding operation.

In molding presses of the type herein disclosed, it is desirable to separate the molds beyond their normal open position thereby to make them easily accessible for cleaning while in other instances it is desirable to apply a force for initially separating them if they stick after a molding operation. The problem of excessively separating the molds for cleaning is complicated not only because of the very large size and weight of the molds thereby necessitating application of power to lift the individual molds, but also by the fact that any one of the series of vertically spaced molds is preferably individually separated whether the mold is at the top, middle or bottom of the series. An additional difficulty arises from the fact that it is necessary to drop the lower half of the uppermost mold in order to make it accessible for cleaning inasmuch as the upper crosshead of the press cannot be lifted to provide the necessary excess separation whereas to clean the lower molds it is necessary to raise the upper half thereof.

It is an object of my invention to provide improved means whereby the molds may be separated beyond their normal open position thereby to render the molds fully and conveniently accessible for cleaning. Another object is to provide improved means whereby a mold having one part immovable when normally open may nevertheless have the two mold halves separated beyond their normal open position and another object in this respect is to accomplish the foregoing regardless of whether the immovable mold part is the upper or lower half of the mold. A further object is to provide improved separating means that may be effectively employed to break initially mold halves stuck together. This improved means for effecting excess separation as well as initial breaking of the mold may be applicable in various types of presses as well as under other circumstances.

A still further object is to provide an improved mold separating means that is relatively simple and economical in construction, operation and maintenance and is rugged, compact and powerful combined with ease of operation and flexibility in selecting any particular mold or molds desired to be separated for cleaning, breaking, etc.

Other objects and advantages will be more apparent to those skilled in the art from the following description of the accompanying drawings in which:

Fig. 2 is a side view of the press shown in Fig. 1;

Fig. 3 is a horizontal section taken substantially on the line 3—3 of Figs. 1 and 2;

Fig. 4 is a fragmentary perspective of one end of a mold and the mechanism for selecting the mold to be lifted by power;

Fig. 5 is a vertical transverse section taken substantially on the line 5—5 of Fig. 2.

Figure 1:
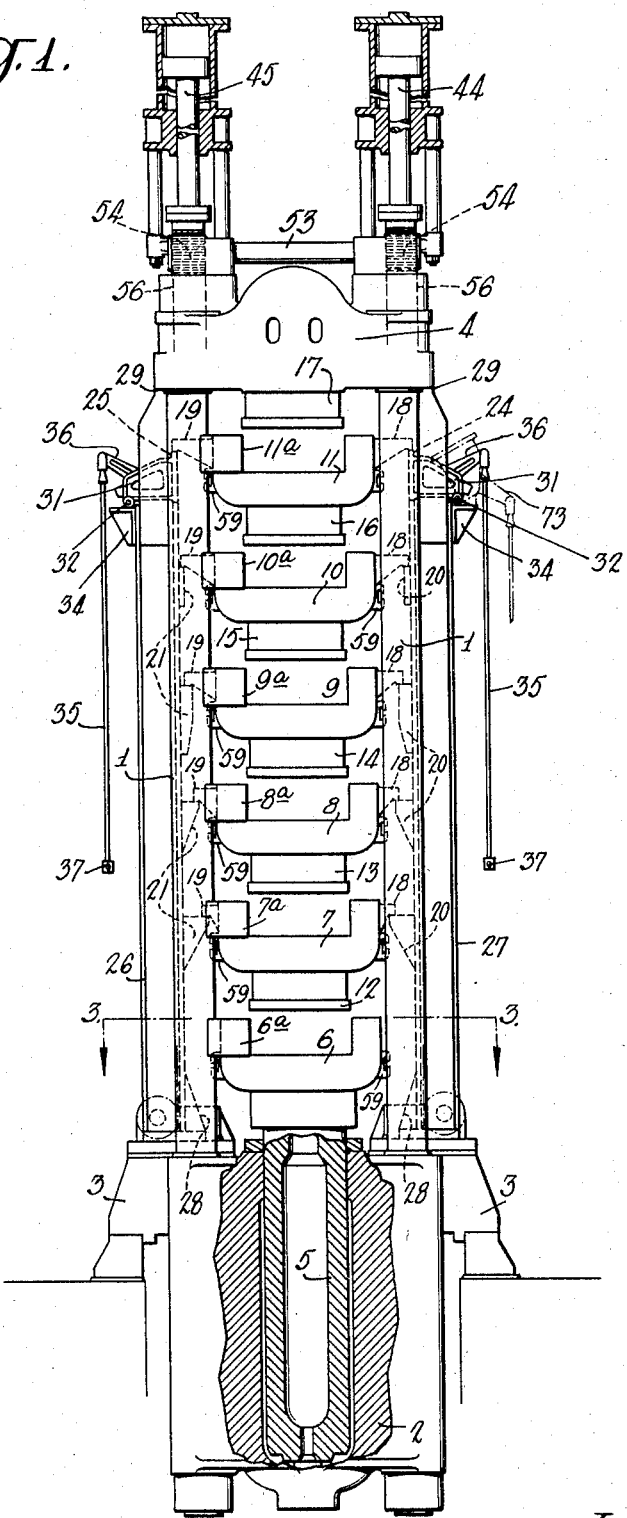
Fig. 1 is an end view of a press embodying my improved mold separating means with parts broken away to show details of construction.

In the particular embodiment of the invention shown herein for purposes of illustration, a usual type of press is employed having a series of joining columns 1 specifically four on each side of the press as shown in Figs. 2 and 3 secured at their lower ends to usual bosses on the side of four cylinders 2, Figs. 1 and 2. Usual footings 3, Fig. 1, are formed as part of the cylinder structure while the upper ends of the joining columns are secured to an upper stationary crosshead 4, Figs. 1, 2 and 5. Rams 5, Fig. 1, in the cylinders 2 commonly support a lowermost mold 6, Fig. 1, which, as shown in Fig. 2, extends for the full length of the press, the rams and cylinders constituting the normal operating mechanism for opening and closing the molds. A series of additional molds 7—11 each have upper plunger-like mold halves 12—16 adapted to be received in the cavities, e. g. 6a—11a, of the lower mold halves disposed immediately below while an additional plunger mold part 17 is disposed in a fixed position on the stationary crosshead 4 for cooperation with the mold cavity 11a. The lower mold cavity 6 when open is also fixed against further opening movement by reason of resting on the rams 5 when in its lower position.

Figure 6:
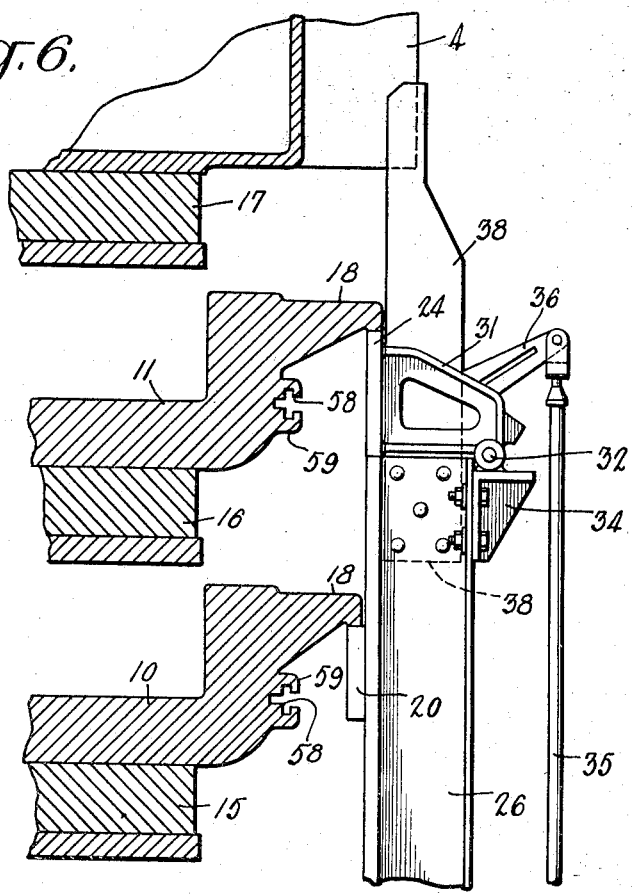
Fig. 6 is an enlarged fragmentary sectional view of the upper right hand movable mold support shown in Fig. 1, and taken substantially on a line 6—6 of Fig. 2.

To support the molds when in their open position as well as to provide a uniform open spacing thereof the molds 7—11 have a series of lateral arms such as 18 and 19, Fig. 1, adapted to rest upon stationary ledges such as 20 and 21. The arms for each successively higher mold are progressively longer and the cooperating ledges therefor are correspondingly shorter thereby permitting arms 18 and 19 of mold 7 to move upwardly past the ledges 20 and 21 for mold 8 and similarly for the arms of the remaining molds. The lowermost mold 6 is supported solely on the upper ends of rams 5 and hence no arms or ledges 18 to 21 are needed. The uppermost mold 11 has its arms 18 supported upon laterally movable ledges 24 and 25 for purposes to be described later. The ledges 20 and 21 on one side of the press are formed on two columns 26 and the ledges on the other side on two columns 27, Figs. 2 and 3, these columns preferably being I-beams located respectively between each pair of joining columns 1. The lower ends of these I-beams are rigidly secured on top of the cylinder structure through feet 28, Fig. 1, while the upper ends, Fig. 2, are bolted or otherwise suitably secured at 29 to the upper crosshead 4. As shown in Fig. 6, the ledges 20 are simply metal blocks welded or otherwise suitably secured to the face of the two pairs of I-beam columns 26 and 27 and ledges 21 shown in other figures are similarly metal blocks secured in the same manner. The upper movable ledges 24 and 25 are identical except that they move outwardly away from each other and hence the description of one will suffice for both. For instance, ledge 24 rests upon the upper end of column 26 and has a substantial arm 31 pivoted as at 32 upon a bracket 34 which is suitably bolted or otherwise secured to the outside surface of column 26. To swing ledge 24 outwardly a pull rod 35 is pivotally secured to an arm 36 of the ledge and terminates in a handle 37 that is conveniently accessible for an operator on the floor level of the press. Each of the four ledges 24, 24 and 25, 25 is provided with similarly accessible pull rods and similar elements are given the same reference numbers. To permit the upper ledges 24 and 25 to seat directly upon the upper end of columns 26 and 27 and still connect these columns to the crosshead 4, the columns may be provided, Fig. 6, with side extensions 38.

The foregoing ledges 20, 21 and 24, 25 support the molds in substantially equally spaced relation when the press is open. However, this spacing is not sufficient to permit convenient access to the mold cavities 6a, etc. for the purpose of cleaning the molds, although the normal spacing shown in Fig. 1 is sufficient for purposes of filling the cavity with material to be pressed and heat treated, such as laminated wood or other material.

To separate the individual molds beyond their normal spacing, I have provided improved mechanism adapted to individually lift the molds, or, if desired, to lift a group of molds above any given mold to be cleaned and this separating mechanism is further adapted to function to break or separate the molds after a molding operation in the event that any two mold parts stick together after the press is opened. This mechanism comprises, as shown in Figs. 2 and 3, a pair of vertically movable columns 40 located on one side of the press and a pair of similar vertically movable columns 41 located on the other side. The two pairs of movable columns are guided, Fig. 2, at their lower ends in suitable openings 42 formed in bosses 43 constituting a part of the upper ends of cylinders 2 while their upper ends are respectively secured to rams 44 on one side and to rams 45 on the other side. To maintain the two pairs of movable columns in unison throughout all of their movements one longitudinal shaft 46, Figs. 2 and 3, is journalled on the upper ends of the cylinders 2 at each side of the press, the shaft on one side having a pair of pinions 47 and 47a meshing with racks 48 and 48a formed on the lower ends of the movable columns at one side and the shaft on the other side having a pair of pinions 49 and 49a meshing with racks 50 and 50a formed on the movable columns on the other side. These sets of equalizing pinions and racks will maintain the two columns on one side in unison with each other but in order to maintain the two pairs of columns on opposite sides of the press in unison, a transverse set, Figs. 1 and 2, of shafts 52 and 53, Fig. 2, are provided with pinions 54 and 55 engaging racks 56 and 57 formed on the upper ends of the movable columns. The longitudinal pinions and racks 47, 48 together with the transverse pinions and racks 53—56 will maintain all of the vertically movable columns in unison with each other during movement thereof when fluid pressure is supplied to the rams 44—45 regardless of the unequal force or pressure that may be required at any given instant to lift the main molds or to force the same downwardly to break the molds apart.

To selectively apply the power of rams 44 and 45 to the molds, each mold is provided, as shown in Figs. 4, 5 and 6, with longitudinal T slots 58 formed preferably in bosses 59 on each side of the mold and at longitudinally spaced points thereof as indicated in Figs. 2 and 3. As shown in Fig. 3, these bosses 59, located adjacent the two pairs of vertically movable columns 40 and 41, are considerably longer than the width of said columns. Shiftable locking bolts 60 longitudinally slide within each T slot, the bolts on one side of a mold being connected by a rod 61 which extends to one end of the mold for pivotal connection as at 62, Fig. 4, to a slotted arm 63. Similarly, the bolts 60 on the other side of the mold, Fig. 3, are connected by a corresponding rod 61 and pivotal connection 62 with a slotted arm 63. These arms 63, 63 are secured to a transverse shaft 64 suitably journalled in bearings 65 formed on the end of the mold. The pairs of vertically movable columns 40 and 41 are provided with inward projections 65 having bolt slots 66 which receive the bolts 60 when they are simultaneously moved inwardly by the operator rotating shaft 64 in a clockwise direction, Fig. 4. To facilitate rotation of shaft 64, the pins 62 may be provided with an annular groove 67 in which a suitable hook on a pole or other device may be received. The locking slots 66 on the vertically movable columns are located adjacent each set of T slots of the successive molds when in their normally open position, thereby providing means for releasably connecting a selected mold to the vertically movable members to separate the selected mold from its adjacent mold.

Operation

Assuming the molds 6—11 are in their normal position shown in Fig. 1 and that it is desired to have cleaning access to cavity 6a of mold 6, the locking bolts 60 on each side of mold 7 will be longitudinally shifted into the adjacent slots 66, Fig. 4, on each of the two pairs of vertically movable columns 40, 40 and 41, 41. Fluid pressure will then be supplied to the under side of each of the four rams 44, 44 and 45, 45 to simultaneously lift all four columns and accordingly lift mold 7 until the mold plunger 13 is received within the mold cavity 7a. During this operation the lowermost mold 6 will remain in its lowermost position and the mold plunger 12 will be raised an appreciable distance above the cavity 6a, Fig. 1, thereby providing ample space for free access to the mold cavity for cleaning the same. After this mold is cleaned or otherwise worked upon as may be desired, it will be lowered onto its ledges 20 and 21. If it is desired to separate any other mold beyond its normal separation, say for example mold 8, then mold 9 will be locked to the two pairs of vertically movable columns 40—41 and lifted as above described. The foregoing operation, however, cannot be employed to separate mold 11 from its normal spaced relation to plunger 17 inasmuch as this plunger is stationary. To overcome this the operator locks mold 11 to the pairs of vertically movable columns 40—41 and lifts them by the rams 45 just sufficiently to raise arms 18 from the ledges 24, 24 and 25, 25 whereupon all four of the latter may be swung laterally to a dotted line position, such as is shown at 73, Fig. 1. Thereupon fluid pressure is exhausted from the underside of rams 44—45 to lower columns 40—41 and accordingly drop the mold 11 so that its plunger 16 will nest into the cavity of mold 10. In this manner ample space is provided for cleaning or otherwise working within the open mold 11. When it is desired to re-establish the normal position of mold 11 the rams 44—45 will lift the mold whereupon the operator swings the mold supports 24 and 25 back to their normal position for supporting the mold. The foregoing mechanism may be employed for forcibly separating any particular mold or molds in case they stick together as a result of a molding operation. After fluid pressure is exhausted from cylinder 2 it is only necessary for the operator to shift the locking bolts 60 of the stuck mold to the adjacent locking grooves 66 of the vertically movable columns whereupon fluid pressure supplied to the upper side of the rams 44—45 will force the mold downwardly away from its mold plunger. This breaking operation may be selectively applied to any one of the molds in case it is desired to break two or more molds at one time. Throughout all of these operations the movement of the four movable columns is equalized.

From the foregoing disclosure it is seen that I have provided a very effective, direct-acting and positive mechanism that allows any one or a plurality of molds to be easily and quickly selected for separation beyond their normal open position regardless of the position of the selected mold in the vertical stack. The apparatus is relatively simple considering the weight, size and capacity of molds involved and the apparatus, by virtue of its relative simplicity, can be made extremely rugged combined with a high degree of compactness and positive control.

It will of course be understood that various changes in details of construction and arrangement of parts may be made by those skilled in the art without departing from the spirit of the invention as set forth in the appended claims.

I claim:

1. A molding press comprising, in combination, a mold having vertically spaced upper and lower halves mechanism for moving the same together during a molding operation and to normally open the same when the operation is completed to provide a clear space of predetermined depth between the whole of the mold halves over their entire mold area, and vertically movable means for engaging the upper half of said mold to move the same upwardly thereby additionally separating said mold halves beyond their normal open position to provide said entire clear space with a depth greater than said predetermined amount.

2. A molding press comprising, in combination, a plurality of vertically spaced molds each consisting of two coacting mold halves, normal operating mechanism for moving the mold halves together during a molding operation and to normally open the same when the operation is completed to provide a clear space of predetermined depth between the whole of the mold halves over their entire mold area, and means for additionally separating said mold halves beyond their normal open position by moving a mold half upwardly while said normal operating mechanism remains inactive to provide said entire clear space with a depth greater than said predetermined amount.

3. A molding press comprising, in combination, a plurality of vertically disposed molds, mechanism for normally opening and closing said molds, and means for selectively separating any one or more of said molds beyond their normal open position while the other molds remain in their normally open position.

4. A molding press comprising, in combination, a plurality of vertically spaced molds each consisting of two coacting mold halves, mechanism for normally opening and closing said mold halves, means for raising a selected mold half to provide additional opening space between said raised mold half and the next lower mold half, and means whereby any two coacting mold halves may be selectively broken apart by said raising means if the selected mold halves stick together.

5. A molding press comprising, in combination, a plurality of vertically disposed molds each consisting of two coacting mold halves, mechanism for normally closing and opening said mold halves, means for additionally opening certain of said mold halves by moving a superimposed mold half upwardly, and means whereby another of said mold halves may be opened by moving it downwardly.

6. A molding press comprising, in combination, a plurality of vertically disposed mold halves, mechanism for normally opening and closing said mold halves, supports on which said mold halves rest when in a normally open position, means for shifting certain of said supports so that they are removed from their mold supporting position whereby the mold half normally supported thereon is adapted to have additional opening movement, and power operated means movably supporting said latter mold half thereby to effect said additional movement upon removal of said shifted support.

7. The combination set forth in claim 6 further characterized in that said shiftable supporters are pivotally mounted so as to be swung out of the path of movement of the mold half that is normally supported thereon.

8. A molding press comprising, in combination, a plurality of vertically disposed molds, each consisting of two coacting mold halves, mechanism for normally closing and opening said mold halves, and means for imparting additional opening movement to said mold halves including a vertically movable member and means for selectively locking any one of said mold halves to said member whereby said additional movement may be imparted to the locked mold half while the unlocked mold halves remain in their normal open position.

9. A molding press comprising, in combination, a plurality of vertically disposed molds each consisting of two coacting mold halves, mechanism for normally closing and opening said mold halves, means for normally supporting said mold halves in an open position, vertically movable means adapted to be locked to a selected mold half to lift the same off of its supports and thereby increase the accessibility to the next lower mold half.

10. A molding press comprising, in combination, a plurality of vertically disposed molds each consisting of two coacting mold halves, vertically movable members disposed adjacent said mold halves, and means for locking a selected mold half to said vertical members including complementary bolt and slot elements one of which is connected to said mold half and the other to said vertically movable members whereby when said bolt is locked in said slot a mold half moves with the vertically movable member while the unlocked mold halves remain in their normal open positions.

11. A molding press comprising, in combination, a plurality of vertically disposed molds each consisting of two coacting mold halves, mechanism for normally closing and opening said mold halves, a plurality of vertically movable members, means for locking a selected mold to each of said members to impart additional opening movement to the locked mold or to effect a breaking force for the mold half while the unlocked mold halves remain in their normal open position, and equalizing means for insuring uniform operation of said vertically movable members.

12. A molding press comprising, in combination, a plurality of vertically disposed molds each consisting of two coacting mold halves, vertically movable members disposed adjacent said mold halves, and means for selectively releasably connecting any given mold half to said members so that movement thereof separates the mold half from its adjacent mold half.

13. A molding press comprising, in combination, a plurality of vertically disposed molds each consisting of two coacting mold halves, means for normally relatively moving said mold halves to open and close the same, vertically movable members disposed adjacent said mold halves, cooperating elements one of which is carried by said members and the other by said mold halves, means for relatively moving said cooperating elements to bring the same into horizontally overlapping relation whereby upon vertical movement of said members a mold half may be moved in addition to its normal opening movement, and power means for actuating said vertically movable members thereby to effect said additional opening movement of a mold half.

14. The combination set forth in claim 13 further characterized in that said cooperating elements include horizontal slots in said vertically movable members, and horizontally movable bolts carried by each of said mold halves and being selectively operable so as to be moved into certain of said slots so that the selected mold is moved with said vertical members.

THOMAS P. TAPPER.